United States Patent
Kissinger et al.

(10) Patent No.: US 6,942,501 B2
(45) Date of Patent: Sep. 13, 2005

(54) MOUNT FOR INPUT/OUTPUT CONNECTOR PANEL

(75) Inventors: John Kissinger, Placentia, CA (US); David Pincek, Huntington Beach, CA (US); Michael Fitzgerald, Long Beach, CA (US); Quan Do, Fountain Valley, CA (US)

(73) Assignee: RGB Systems, Inc., Anaheim, CA (US)

( * ) Notice: Subject to any disclaimer, the term of this patent is extended or adjusted under 35 U.S.C. 154(b) by 0 days.

(21) Appl. No.: 10/373,672

(22) Filed: Feb. 24, 2003

(65) Prior Publication Data

US 2004/0079846 A1 Apr. 29, 2004

Related U.S. Application Data (60) Provisional application No. 60/360,063, filed on Feb. 25, 2002.

(51) Int. Cl.$^7$ ................................................ H01R 13/46
(52) U.S. Cl. ............................ 439/131; 174/67; 220/3.8
(58) Field of Search ............................ 439/131; 174/59, 174/67; 292/256–8, 303, DIG. 4, 17, 18

(56) References Cited

U.S. PATENT DOCUMENTS

| | | | | |
|---|---|---|---|---|
| 1,348,108 A | * | 7/1920 | Harden | 292/18 |
| 2,711,944 A | * | 6/1955 | Meek et al. | 292/18 |
| 2,756,087 A | * | 7/1956 | Kinna | 292/256.65 |
| 3,812,659 A | * | 5/1974 | Westergren et al. | 292/17 |
| 4,250,599 A | * | 2/1981 | Nagashima et al. | 292/17 |
| 4,984,982 A | * | 1/1991 | Brownlie et al. | 439/131 |
| 5,002,319 A | * | 3/1991 | Chandler | 292/17 |
| 2002/0127897 A1 | * | 9/2002 | Sharples | 439/131 |

* cited by examiner

*Primary Examiner*—Renee Luebke
(74) *Attorney, Agent, or Firm*—The Hecker Law Group, PLC (57) ABSTRACT

A concealable mount for connectors, such as input/output jacks or ports, is presented. The mount comprises a base with and opening for mounting to a support structure. A front panel that is movably connected to the base, is moveable between a first closed position in which the front panel extends along the front face of the base over the opening therein, and a second open position in which at least a portion of the front panel is positioned outwardly from the base. A support extends rearwardly from the front panel and is adapted to mount connectors associated with the panel. A piston arrangement is used to bias the front panel to its open position, and a latch mechanism selectively maintains the front panel in its closed position. In its closed position, the front panel conceals the connectors, and when in its open position, the front panel exposes the support and the connectors.

20 Claims, 11 Drawing Sheets

MOUNT FOR INPUT/OUTPUT CONNECTOR PANEL

This application claims priority of U.S. Provisional Application No. 60/360,063 filed on Feb. 25, 2002, entitled "Mount for Input/Output Connector Panel," the specification of which is herein incorporated by reference.

BACKGROUND OF THE INVENTION

1. Field of the Invention

The present invention relates to mounting devices, and more particularly to a mount for securing a connector panel to a support structure in a discreetly accessible manner.

2. Background Art

There are a wide variety of instances where it is desirable to mount connectors, such as input/output jacks or ports. For example, jacks or ports may be located throughout the space of an office building, hotel, convention hall or other locations. Each jack or port is typically connected to a wire leading from a remote location which either delivers an output signal, or receives an input signal.

If the jack or port is an output jack or port, a mating plug or connector when connected thereto will receive an output signal from the remote location. If the jack or port is an input jack or port, a mating plug or connector when connected thereto can deliver an input signal. In this manner, audio, video, computer and other equipment may be located far from a remote device, but still communicate with the device. The jacks or ports allow a wide variety of devices to be connected, and when jacks or ports are provided in multiple locations, allows devices to be connected in a desired area without unnecessary cabling or the like.

These jacks or ports are well known. For example, RS-232 jacks are well known and usually located through a home for accepting a mating plug of a telephone. Often, these jacks or ports simply comprise a plate having the jack mounted therein, the jack or port facing outwardly for accepting a mating connector. The plate is mounted to a support surface, such as a wall. In this configuration, the jack or port is readily visible at all times.

These jacks or ports are generally visually unappealing. When multiple jacks are provided, including where groups of jacks are provided in close vicinity, the jacks can be very unsightly. It is desirable to arrange the jacks or ports so that they may be conveniently accessed. Thus, efforts to minimize the unsightly aspect of these jacks or ports, such as by locating them in inconspicuous areas, are not suitable.

There is needed an improved mount for jacks or ports, the mount both effective in securing the jacks or ports to a supporting surface, permitting convenient access to the jacks or ports, and at the same time addressing the above-referenced problem of these jacks or ports being unsightly.

SUMMARY OF THE INVENTION

The present invention comprises a mount for one or more connectors, such as input/output jacks or ports, and a method of utilizing a mount to selectively conceal or provide access to the connectors.

In one embodiment, the mount comprises a base having a front face, a rear face and an opening therethrough. The base is configured to be connected to a support structure, such as by threaded fasteners extending through apertures in the base. The mount also includes a front panel. The front panel has a front face and a rear face, the front panel movably connected to the base for selectively covering the opening in the base. In one embodiment, the front panel is connected to the base by at least one hinge, allowing the front panel to move between a first closed position in which it extends along the front face of the base over the opening therein, and a second open position in which at least a portion of the front panel is positioned outwardly from the base.

In one embodiment, a support extends from the rear face of the front panel. The support is adapted to mount one or more connectors, such as input and output jacks or ports associated with a panel.

In one embodiment, the mount includes a piston having a body and an extendable arm, the body connected to the base and the extendable arm directed towards the rear surface of the front panel. The arm of the piston is adapted to bias the front panel to its open position.

The mount includes a latch mechanism. The latch mechanism includes a body connected to the base and a catch connected to the front panel, the latch in one position maintaining the front panel in its closed position.

One embodiment of the invention comprises a method of using a mount. In one embodiment, one or more connectors, such as input/output jacks, are connected to the mount. In one embodiment, the connectors are associated with one or more panels, and the one or more panels are connected to the support which extends from the front panel.

The mount is connected to a support structure. In one embodiment, threaded fasteners are utilized to connect the base to a support structure, such as a wall, housing or box. The base is connected with its rear surface facing the support structure, and the front panel facing away from the support structure so as to be accessible. When connected to a support structure, various components of the mount are located behind the base and within a space defined by the support structure, such as in an interior space of a gang box.

When mounted, the front panel may be retained by the latching mechanism in its closed position. In its closed position, the support and the connectors mounted to the support are not visible.

The front panel may be moved to its open position. In one embodiment, when the latch mechanism is released, the piston biases the front panel outwardly. In one embodiment, this comprises rotating the front panel to an open position. A catch on the support limits movement of the front panel to a position in which the support is exposed and accessible. In this position, the one or more connectors, such as jacks or ports of a panel mounted to the support, are also accessible. In this position, mating connectors, such as those associated with audio or video equipments may be connected to the connectors of the mount.

Further objects, features, and advantages of the present invention over the prior art will become apparent from the detailed description of the invention which follows, when considered with the attached figures.

DETAILED DESCRIPTION OF THE INVENTION

The invention is a mount for an input/output connector panel. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a mount for one or more input/output connectors, such as one or more input and/or output jacks or ports associated with a panel. In one embodiment, the mount includes a base for connecting the mount to a supporting structure, such as a wall, housing or box. The mount also includes a front panel connected to the base and configured to support the input/output connectors, such as in the form of a panel of jacks. The panel is moveable between two positions, one where the connectors are visible and accessible, and another where the connectors are concealed.

Figure 1:
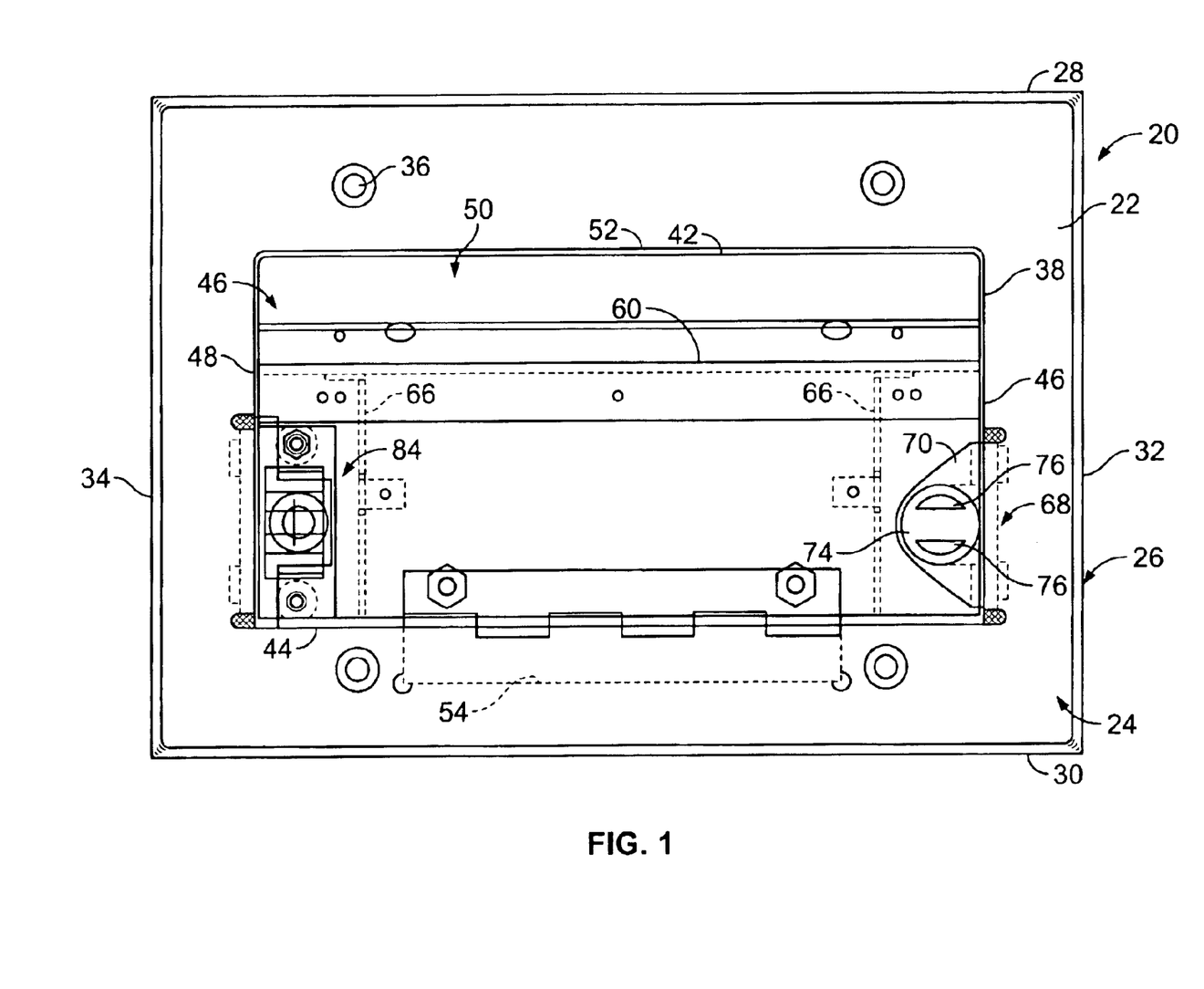
FIG. 1 is a front view of a mount in accordance with an embodiment of the present invention.

One embodiment of a mount 20 of the invention will now be described in more detail. Referring first to FIG. 1, in one embodiment, the mount 20 includes a base 22. The base 22 may have a variety of configurations. In one embodiment, the base 22 is a generally planar, plate-like member. As illustrated, the base 22 is generally rectangular in shape. The base 22 has a front side or face 24 and an opposing rear side or face 26. The base 22 has a top edge 28, bottom edge 30, first side edge 32 and second side edge 34. The top and bottom edges 28, and 30 are located at opposing portions of the base 22, and extend generally parallel to one another. The first and second side edges, 32 and 34, are also located at opposing portions of the base 22, and extend generally parallel to one another and generally perpendicular to the top and bottom edges 28, and 30. The shape of base 22 may vary from that illustrated herein, for example being round or square.

Means are provided for connecting the base 22 to a support structure. In one embodiment, this means comprises one or more fasteners, such as threaded fasteners or nails. Adhesive or other means may be utilized. In an embodiment where the means comprises fasteners, a plurality of apertures 36 is provided in the base 22. As illustrated, these apertures 36 comprise openings or passages through the base 22 from the front side 24 to the rear side 26. In the embodiment illustrated, four apertures 36 are provided, arranged in a rectangular pattern. Other numbers of apertures may be provided and they may be located in a variety of positions.

A main opening 38 is defined by the base 22. In one embodiment, the main opening 38 is a generally rectangular opening which is generally centrally located in the base 22 between its edges 28, 30, 32, and 34.

In one or more embodiments, the mount 20 includes a front panel 40. In one embodiment, the front panel 40 is configured so that in one position it extends over or covers the main opening 38 in the base 22, and another in which at least a portion of the front panel is positioned outwardly there from.

In one embodiment, the front panel 40 comprises a generally flat plate. As illustrated, the front panel 40 has a shape and size substantially similar to that of the main opening 38, only being slightly larger to completely cover the opening 38 when positioned adjacent the opening. The front panel 40 may have other shapes and sizes.

The front panel 40 has a corresponding top edge 42, bottom edge 44, and first and second side edges 46, and 48 to the edges of the base 22. The front panel 40 has a front face or surface 50, and an opposing rear face or surface 52.

In one embodiment, the front panel 40 is movably connected to the base 22. In a preferred embodiment, the front panel 40 is hingedly connected to the base 22. As illustrated, one portion of a hinge 54 is connected to the base 22 adjacent a bottom portion of the opening 38. An opposing portion of the hinge 54 is connected to the front panel 40 near the bottom edge 44. In one embodiment, the hinge 54 is connected to the rear surface 26 of the base 22 and rear surface 54 of the front panel 22 so that it is not exposed.

The front panel 40 may be movably connected to the base 22 in other manners. For example, a plurality of hinges may be utilized. In another embodiment, the front panel 40 may include pins extending from either side edge 46, or 48 into engagement with mating passages in the base 22.

Figure 2:
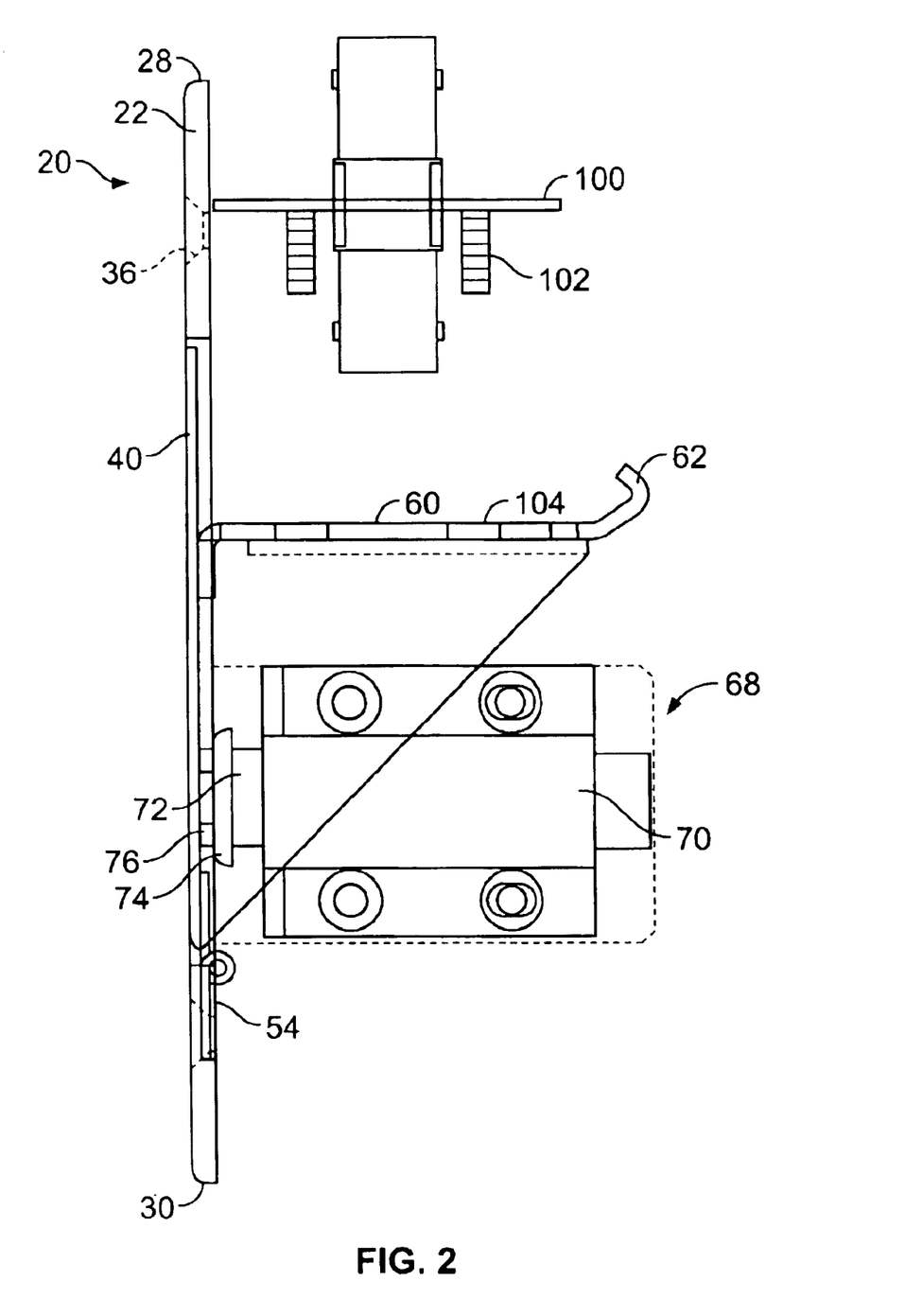
FIG. 2 is a first side view of the mount illustrated in FIG. 1, illustrating a piston of the mount and a front panel in a closed position.
Figure 3:
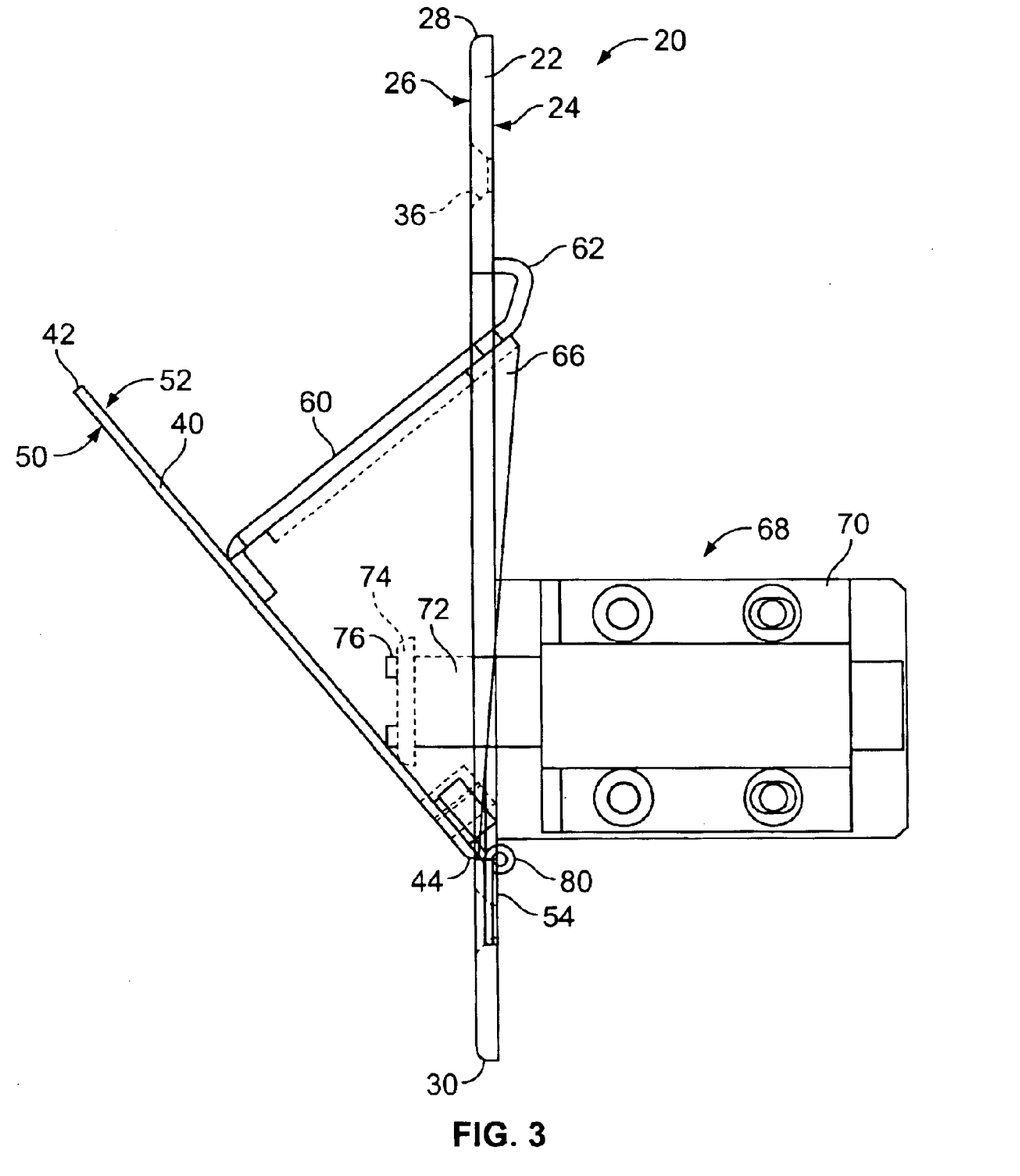
FIG. 3 is a first side view of the mount illustrated in FIG. 1, illustrating the piston and the front panel in an open position.

As illustrated in FIGS. 2 and 3, the hinge 54 connects the front panel 40 to the base 22, and also permits the front panel 40 to be moved from a first, closed or retracted position in which it is positioned along the base 22, to a second, open or extended position in which at least the top edge 42 of the front panel is located outwardly from the base 22. In this embodiment, movement of the front panel 22 is by rotation about the hinge 54.

Figure 6:
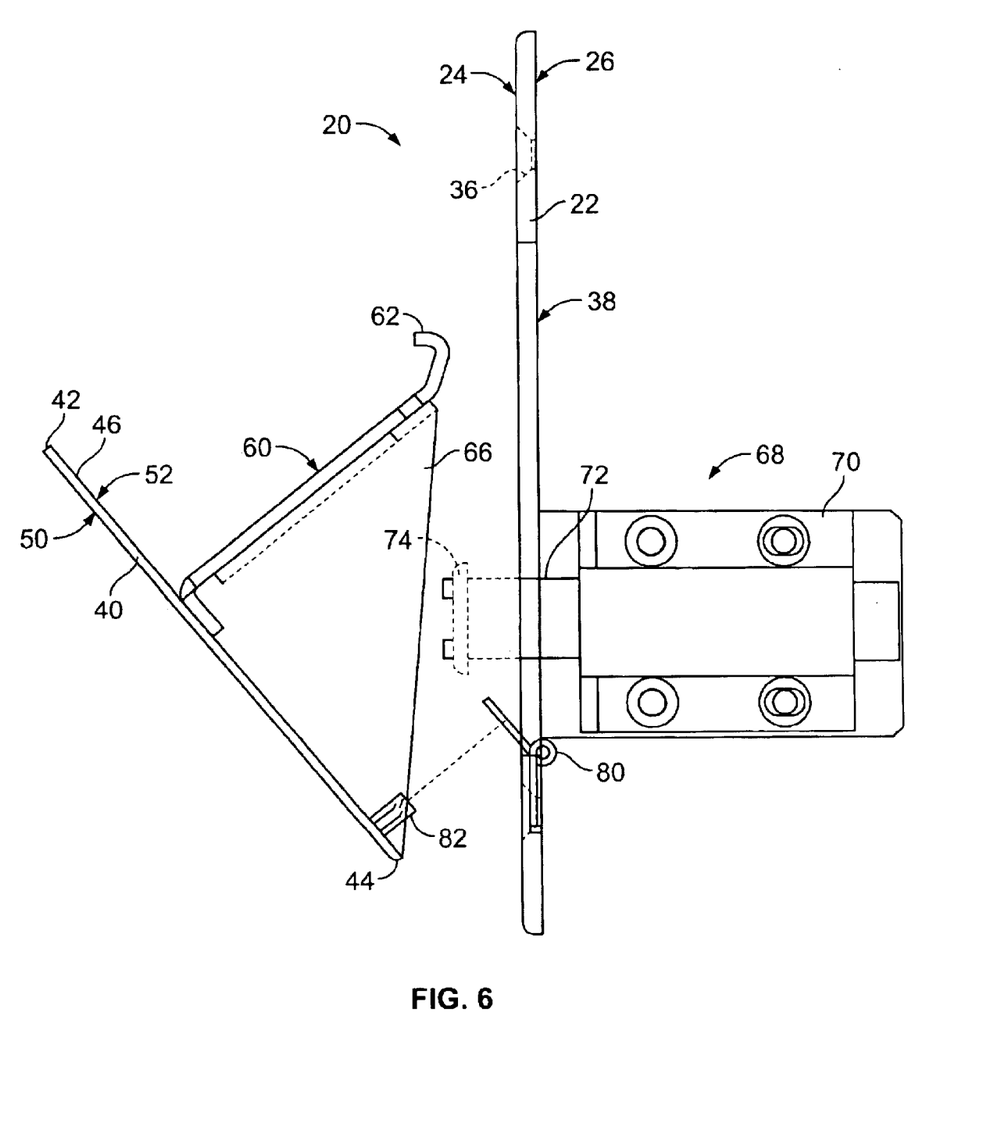
FIG. 6 is a partial assembly view of the mount illustrated in FIG. 1 illustrated from a first side thereof.

In one or more embodiments, the front panel 40 includes means for accepting one or more connectors, and more preferably, a panel having one or more connectors associated therewith. Referring to FIG. 6, in one embodiment, this means comprises a support 60. The support 60 extends outwardly from the rear surface 52 of the front panel 40. In one embodiment, the support 60 defines a generally planar mounting surface which extends generally perpendicular to front panel 40. In one embodiment, a first portion of the support 60 is connected to the front panel 40. An opposing portion of the support 60 defines a generally "C" shaped catch 62.

Figure 10:
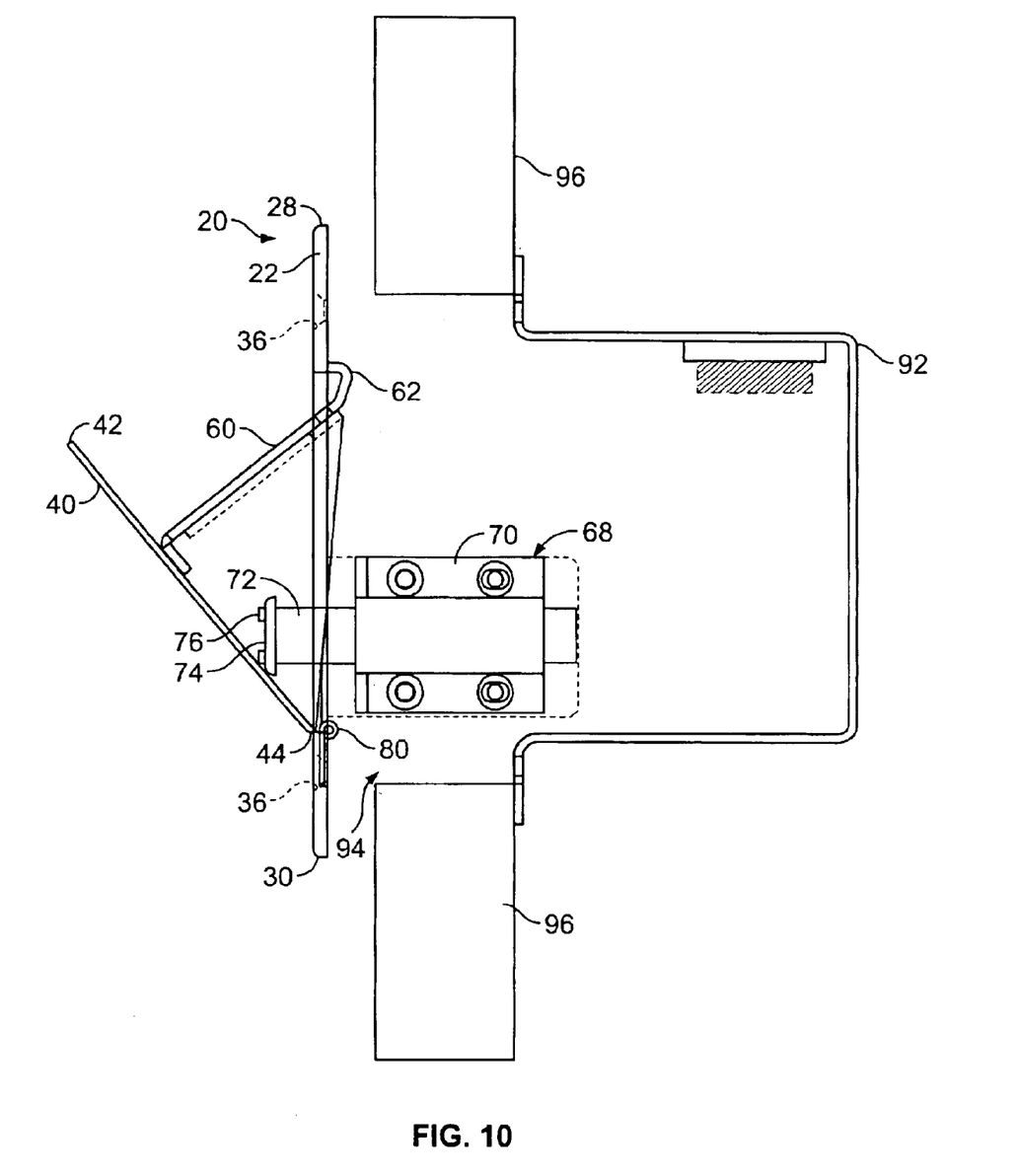
FIG. 10 is a cross-sectional view of a mount of the invention as connected to a supporting structure comprising a wall and gang box.
Figure 11:
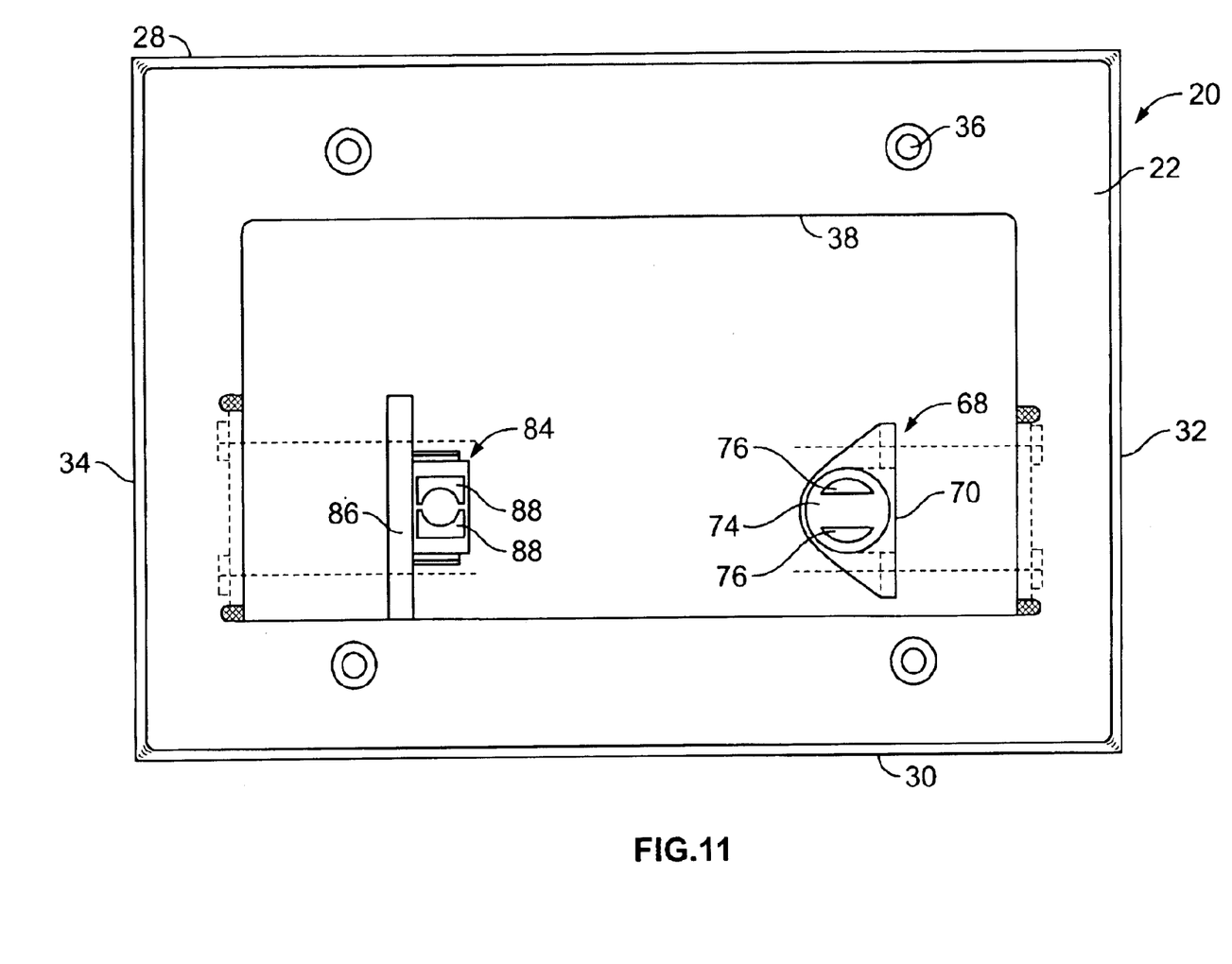
FIG. 11 is a partial assembly view illustrating a front of the mount of the invention and a latch and piston mechanism thereof.

As described in more detail below and illustrated in FIGS. 3, 5 and 10, the catch 62 is arranged to engage the rear surface 26 of the base 22 when the front panel 40 is in its open position. In one or more embodiments, the support 60 extends from the front panel 40 nearly midway between the top edge 42 and bottom edge 44 of the front panel 40. The support 60 is sized to support one or more connectors or connector panels.

In one embodiment, a side wall 66 extends between a bottom portion of the support 60 and the front panel 40 generally at each end of the support 60. As illustrated, each side wall 66 is generally triangular in shape. As described in more detail below, the side walls 66 cooperate with the support 60 and front panel 40 to define a partially enclosed space within which various components of the mount 20 are located and hidden when the front panel 40 is in its open position.

In one embodiment of the invention, the mount 20 includes means for biasing the front panel 40 to its open position. Referring to FIGS. 2 and 3, in one embodiment this means comprises at least one piston 68. In one embodiment, a piston 68 is located at a position corresponding to one side of the front panel 40 (see FIG. 1).

In one embodiment, the piston 68 includes a body 70. The body 70 is connected to the base 22. The body 70 of the piston 68 may be connected to the base 22 in a variety of manners. In one embodiment, the body 70 is connected to a support which extends outwardly from the rear face 26 of the base 22.

The piston 68 includes a moveable arm 72. The arm 72 has a first end connected to the body 70 and a second end comprising a head 74. The piston 68 may be of a variety of types, including mechanical or electro-mechanical in operation. Preferably, the piston 68 is configured such that the arm 72 is biased outwardly. For example, the piston 68 may be of the spring-operated type, as illustrated in more detail in FIG. 12.

As illustrated in FIG. 2, in one position the arm 72 is retracted, permitting the front panel 40 to be located in its closed position. As illustrated in FIG. 3, in another position the arm 72 is extended, moving the front panel 40 its open position.

In one embodiment, the piston 68 may include a locking position in which the arm 72 is maintained in its retracted position. The arm 72 may be released, for example, by rearward movement of the arm 72 (such as by pressing inwardly upon the front panel 40). The operation of these types of pistons 68 is well known to those of skill in the art.

In one embodiment, one or more magnets 76 are mounted to the head 74 of the arm 72 of the piston 68. When the front panel 40 is constructed of metal or includes a corresponding metallic or magnetic part, the magnets 76 are useful in retaining the front panel 40 in its closed position when the arm 72 is retracted.

It is contemplated that other means may be provided for biasing the front panel outwardly. The piston 68 may be constructed in a wide variety of manners other than as described, and multiple pistons may be provided, especially if the front panel 40 is very large. One example of another biasing means is one or more springs, such as coil springs which could be provided between the base 22 and front panel 40.

In one embodiment, the mount 20 includes means for biasing the front panel 40 towards its closed position. Referring to FIG. 6, in one configuration this means comprises a spring 80. In one embodiment, the spring 80 is a coil or loop type spring having a first end and a second end. As illustrated, a first end of the spring 80 is connected to the base 22. A second end of the spring 80 is connected to the front panel 40. In one embodiment, a stay 82 is mounted to the rear surface 52 of the front panel 40 near its bottom edge 44. The stay 82 is configured to accept the second end of the spring 80 in a secure fashion.

The biasing force generated by the spring 80 is preferably less than that generated by the piston 68, so that the front panel 40 is not continuously biased towards its closed position. Preferably, the spring 80 provides sufficient biasing force to provide for smooth movement of the front panel 40 to its open position when the piston 68/front panel 40 is released from its closed position.

In one embodiment, the mount 20 includes means for maintaining the front panel 40 in its closed position. As described above, in one embodiment, the piston 68 may be provided with a locking retracted position for its arm 72. In this position, the magnets 76 may maintain the front panel 40 in its closed position.

Figure 4:
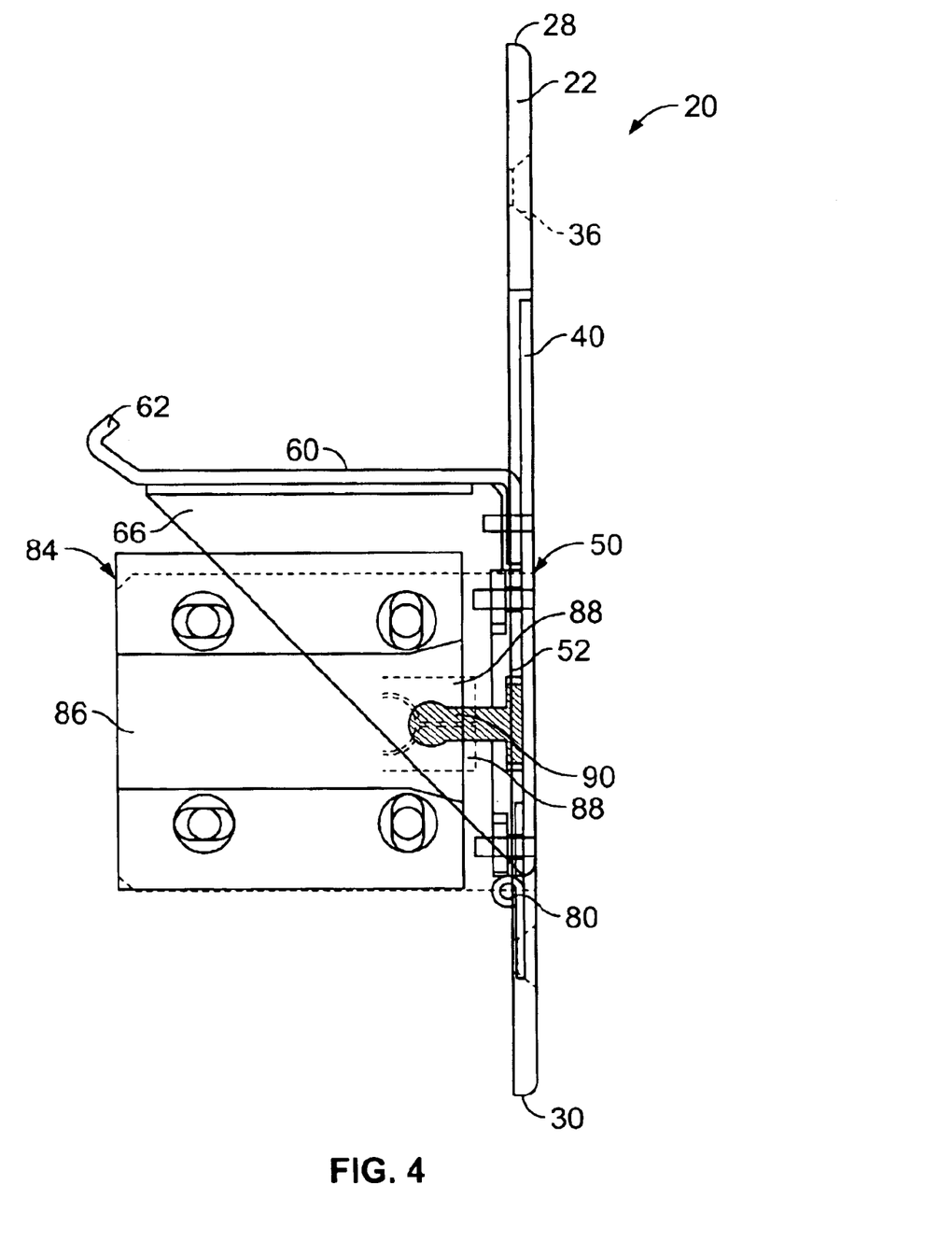
FIG. 4 is a second side view of the mount illustrated in FIG. 1, illustrating a latch mechanism of the mount and the front panel in a closed position.
Figure 5:
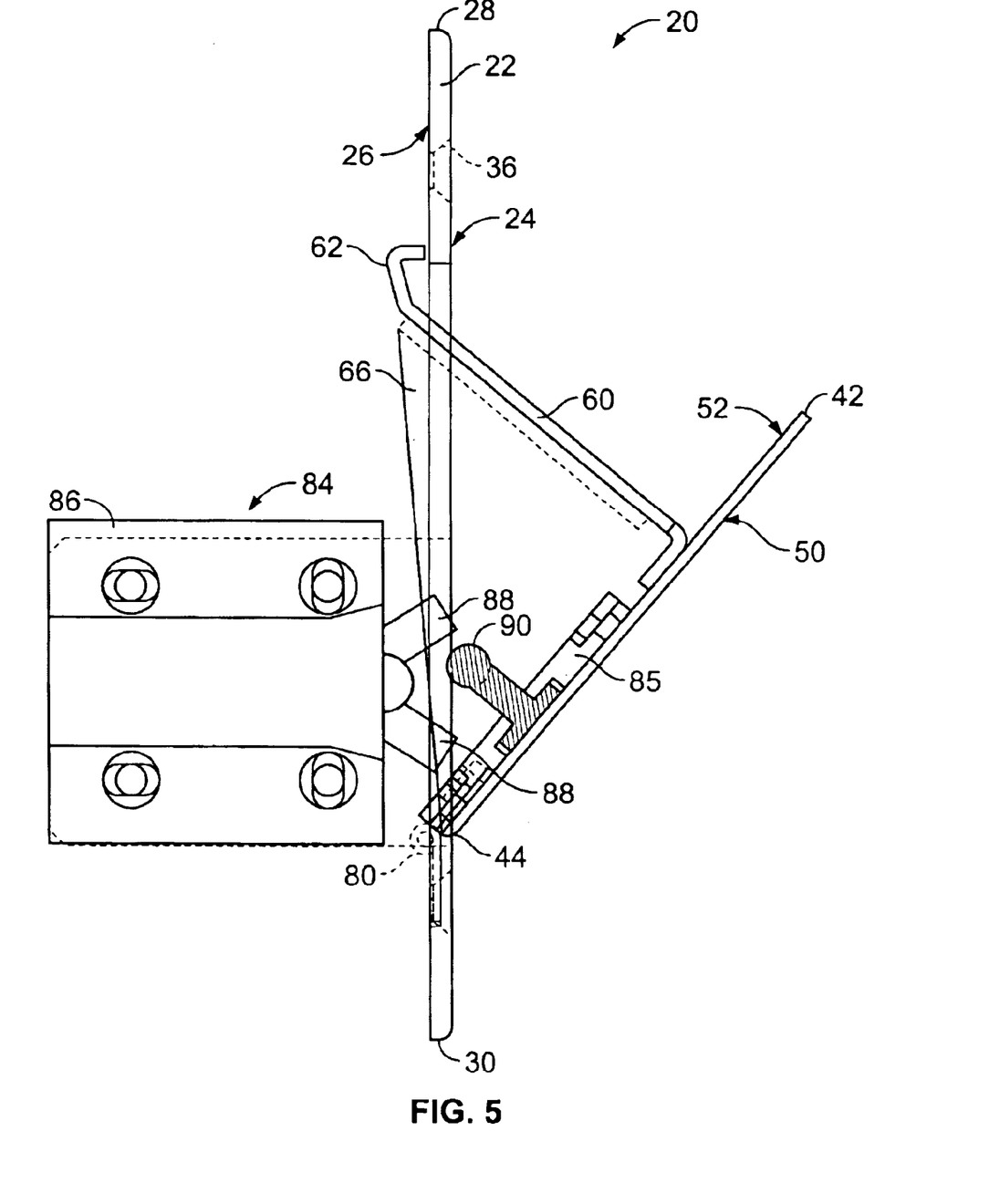
FIG. 5 is a second side view of the mount illustrated in FIG. 1, illustrating the latch mechanism and the front panel in an open position.

Referring to FIGS. 4 and 5, in one embodiment, the mount 22 includes an additional means for maintaining the front panel 40 in its closed position. In one embodiment, this means comprises a latch mechanism 84. The latch mechanism 84 includes a body 86 which is connected to the base 22. The body 86 may be connected to the base 22 in a variety of manners. In one embodiment, like the body 70 of the piston 68, the body 86 of the latch mechanism 84 may be connected to a support or mount which extends outwardly from the rear face 26 of the base 22. In one embodiment, the latch mechanism 84 is arranged to engage an opposing portion of the front panel 40 from the piston 68 (see FIG. 1).

The latch mechanism 84 also includes at least one, and preferably two latch arms 88 arranged to selectively engage a catch 90. As illustrated in FIG. 4, in one position, the latch arms 88 are arranged to extend around and engage the catch 90. Referring to FIG. 5, in another position, the latch arms 88 are arranged to rotate away from one another and the catch 90, releasing the catch 90.

As illustrated, the catch 90 extends outwardly from the rear surface 52 of the front panel 40. Catch 90 is held in place by plate 85 which is attached to rear surface 52 of front panel 40. Any suitable means, e.g., fasteners may be used to attach plate 85 to surface 52 of front panel 40 as shown in FIG. 4. In one embodiment, a first end of catch 90 comprises a generally spherical ball while a second end comprises a flat plate. The flat plate end fits into a groove on the side of plate 85 which makes contact with surface 52 of front panel 40. The configuration of the catch 90 and latch arms 88 may vary. Also, the means by which catch 90 is attached to front panel 40 may vary.

The latch mechanism 84 may operate in a variety of manners. In one embodiment, when the latch arms 88 are engaging the catch 90 in the position illustrated in FIG. 4 and the catch 90 is moved inwardly, the latch arms 88 release and move to their open positions. This movement of the catch 90 may be effected by pressing inwardly upon the front panel 40. Alternatively, when the catch 90 is moved into engagement with the latch arms 88 from the position illustrated in FIG. 5, the latch arms 88 are configured to engage the catch 90 and retain it, thus maintaining the front panel 40 in its closed position.

It is contemplated that the latch mechanism 88 may be of a variety of types and configurations. Further, more than one latch mechanism may be provided.

Additional aspects of the mount 20, including its use and operation will now be described. The mount 20 may be connected to a variety of members. Preferably, the mount 20 is connected to a support structure. In one embodiment, as illustrated in FIG. 10, this support structure may comprise a gang box 92. These gang boxes (e.g., 92) and similar housings are well known.

As illustrated, the gang box 92 is located behind an opening 94 in a wall 96. The gang box 92 defines a generally enclosed area behind the opening 94 in the wall 96 in which components may be located, including components of the mount 20 of the invention.

In one embodiment, threaded fasteners (not shown) are passed through one or more of the apertures 36 in the base 22 and into engagement with the gang box 92. In this configuration, the base 22 extends over the opening 94 in the wall 96 and is mounted flush with the wall 96. The front panel 40 faces outwardly, while components of the mount 20 are located in the area defined by the gang box 92 and base 22.

The mount 20 may be mounted to other structures and in a wide variety of other manners. For example, the base 22 may be connected to a wall of a podium or the like, with components thereof extending into an open space behind that wall (i.e. not within a housing or gang box).

The mount 20 may be used to mount a wide variety of connectors, such as connectors associated with one or more panels. FIG. 2 illustrates one arrangement for the connection of a connector panel 100. As illustrated, the connector panel 100 includes mounting pins 102 for extension through corresponding apertures 104. The pins 102 may be threaded so as to accept a nut (after passage through the support 60) to lock the panel 100 to the support 60.

Figure 7:
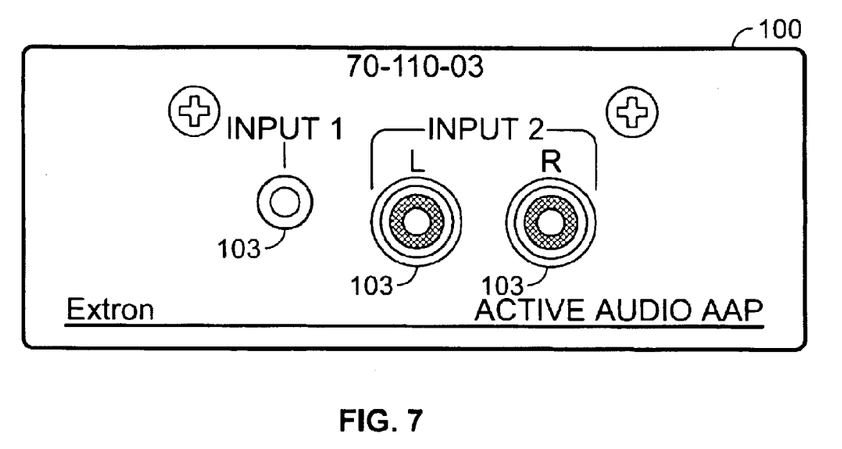
FIG. 7 is a plan view of a connector panel of the type which may be supported by the mount of the invention.
Figure 9:
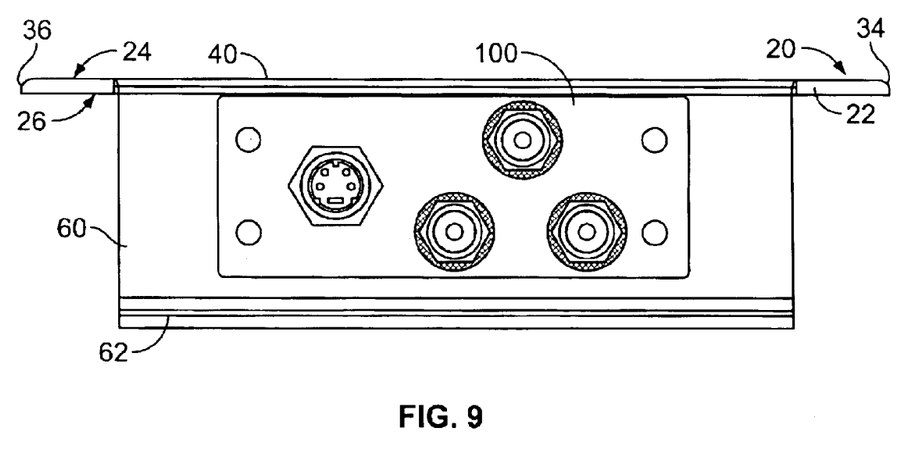
FIG. 9 is a top view of a portion of the mount illustrated in FIG. 1 with a front panel in an open position exposing a connector panel.

FIGS. 7 and 9 illustrate two different embodiments of panels 100 including connectors. These panels 100 may be referred to as AAP or architectural adaptor plates. As illustrated in FIG. 7, these connectors may comprise input and output jacks 103, such as for audio and video signals. The particular types of jacks, ports or connectors which are mounted may vary. For example, the connectors or jacks may be for S-video, coaxial audio or video, component video, composite video, digital optical or coaxial, RS-232, USB (Universal Serial Bus), power, or a wide variety of other types of connectors now known or later developed. As indicated, the support 60 may be arranged to accept more than one panel 100.

Figure 8:
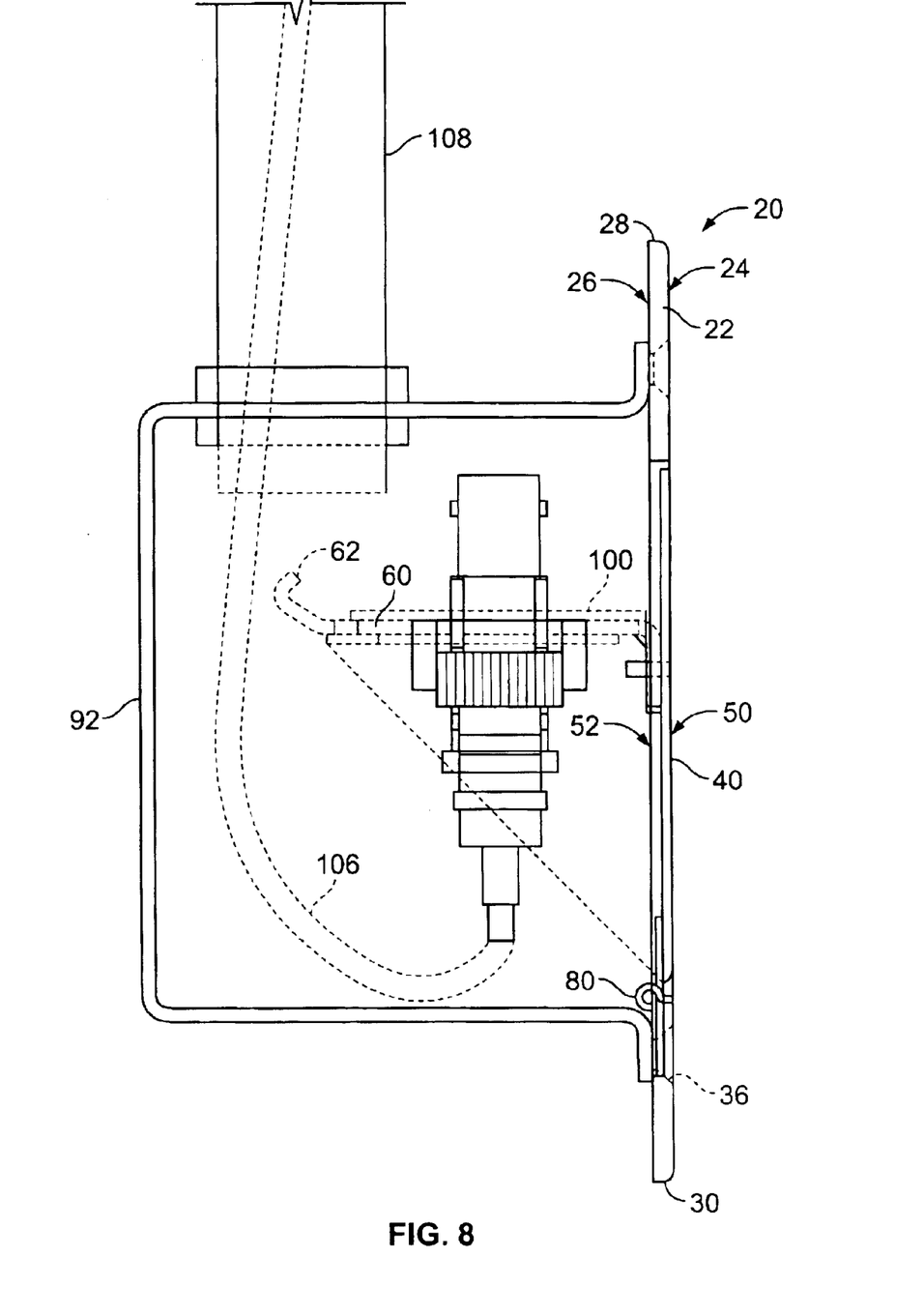
FIG. 8 is a cross-sectional side view of the mount illustrated in FIG. 1.

As illustrated in FIG. 8, in one embodiment, when a panel 100 is connected to the support 60, the connectors have a first end which is located at the top side of the support 60, and an opposing end which is located beneath (by extending through an opening in) the support 60. As illustrated, a line or wire 106 may be connected to this second end of the connector over which a signal may be transmitted to and from the connector, such as to and from a remote device. As illustrated, this line, or wire 106 may be extended through the gang box 92 and routed through a conduit 108 in communication therewith.

In one position, as illustrated in FIGS. 2 and 4, the front panel 40 may be located in its closed position. In this position, the front panel 40 abuts the base 22 and extends over the opening 38 (see FIG. 1) in the base 22. The support 60, including connectors or panel(s) 100 connected to the support are located behind the base 22 and hidden from view. For example, the support 60 may be located within the space defined by a gang box 92 located behind the base 22.

The front panel 40 is retained in position by the latch mechanism 84. As described above, the spring 80 and the magnets 76 of the piston 68 also aid in retaining the front panel 40 in this position.

As illustrated in FIGS. 3 and 5, the front panel 40 may be moved to its open position. In one embodiment, when the front panel 40 is pressed slightly inwardly, the latch mechanism 84 releases and the piston 68 biases the front panel 40 outwardly. In one embodiment, the front panel 40 rotates about the hinge 54 until the catch 62 on the support 60 engages the base 22.

At this time, the top surface of the support 60 is preferably exposed and oriented at approximately a 45 degree angle (when the base 22 is vertically mounted) for optimum viewing. Thus, when one or more panels 100 are connected to the support 60, they are readily accessible, such as for accepting mating connectors into the connectors of the panels 100. It will be appreciated that in the embodiment illustrated, the degree of rotation of the front panel 40 is dictated by the length of the support 60 and when the catch 62 of the support engages the base 22. Other means may be provided for stopping the front panel 40 in one or more particular positions, including positions where the support is located at other angles.

As illustrated in 3 and 5, when the front panel 40 is moved to its extended or open position, the piston 68, latch mechanism 84 and other components, such as wiring, are hidden from view by the front panel 40 and the side walls 66 extending from the front panel. These side walls 66 serve to screen the side areas between the base 22 and front panel 40.

When the user is done using the connectors, such as connectors connected to the panels 100, the user may rotate the front panel 40 back to its closed position. The front panel 40 is rotated inwardly until the catch 90 engages the latch arms 88, latching the front panel 40 in its closed position.

A wide variety of variations of the mount 20 of the invention are contemplated. The various components of the mount 20 may be constructed from a wide variety of materials and in a wide variety of manners, as is known. For example, the base 22 and front panel 40 may be constructed of metal, and may be painted.

As indicated, the size and shape of the mount 20, including base 22 and front panel 40, may vary depending upon the desired used. The size may depend in part upon the number and size of connector panels 100 which are desired to be mounted to the mount 20.

Figure 12:
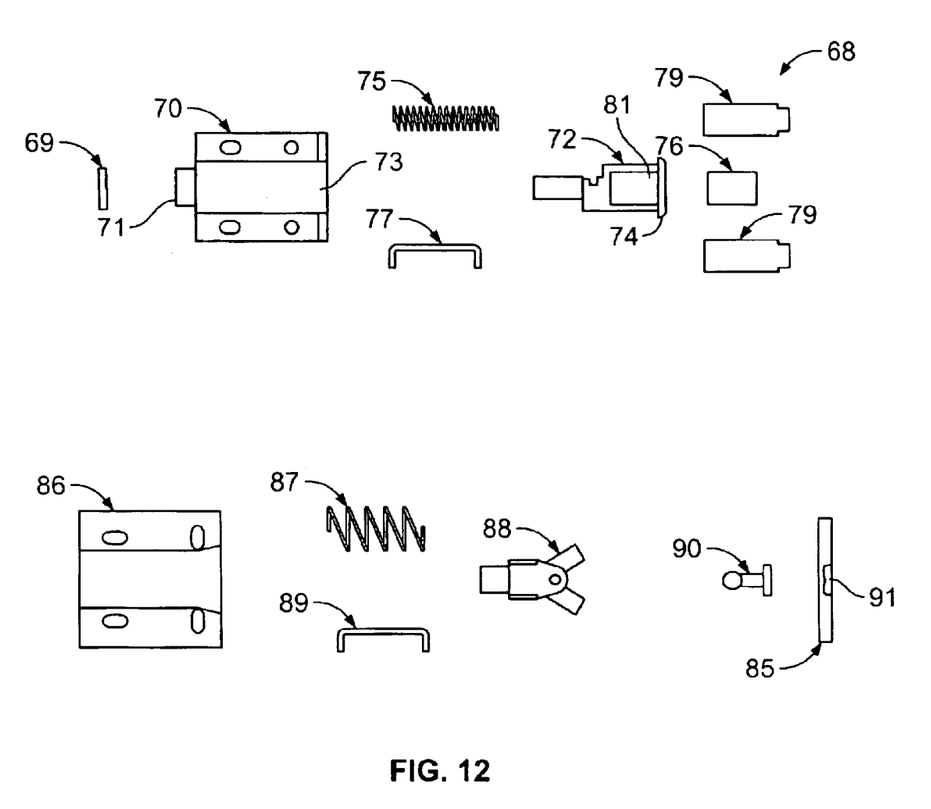
FIG. 12 is an exploded view of a latch mechanism and piston of a mount in accordance with one embodiment of the invention.

The configurations of the latch mechanism 84 and piston 68 may vary. FIG. 12 illustrates, in an exploded view, one embodiment of a piston 68 of the invention. As illustrated, coil 69 holds arm 72 in place in housing 70 so that arm 72 does not fall freely out the back portion 71 of housing 70. Spring 75 fits inside housing 70 in hollow opening 73. Latch member 77 also fits into housing 70. It functions to latch arm 72 in place when arm 72 is in the retracted position. Shims 79 hold the spring 75 and latch member 77 into place in housing 70. Magnet 76 slides into groove 81 of arm 72. These components form the piston 68.

FIG. 12 also illustrates, in an exploded view, one embodiment of a latch mechanism 84 of the invention. Catch 90 fits into groove 91 in plate 85 which attaches to the rear surface 52 of front plate 40. Spring 87 and latch member 89 fit into housing 86 to hold latch arms 88 in place in housing 86. Housing 86, spring 87, latch member 89, and latch arms 88 comprise latching mechanism 84.

The mount 20 in accordance with the various embodiments of the invention has numerous advantages. A primary advantage is that the mount 20 supports one or more connectors, such as jacks or ports 103. These connectors are hidden from view when not in use by the front panel 40 in its closed position. In its closed position, the front panel 40 and base 22 present an aesthetically appealing view.

When a user desires to utilize the one or more connectors, however, the connectors can be readily accessed. The front panel 40 is rotated outwardly to expose the connectors in a conveniently accessible position.

The mount 20 is simply constructed and easy to install. The mount 20 need only be connected to a support structure, such as with screws.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A mount for one or more connectors comprising:
   a base having a planar configuration front face and a rear face and an opening therethrough, said base adapted to be connected to a support structure;
   a front panel, said front panel having a front face and a rear face, said front panel hingedly connected to said base for selectively covering said opening, said front panel movable between a closed position in which said front panel extends along said front face of said base over said opening, and an open position in which at least a portion of said front panel is positioned outwardly from said base;
   a support extending from said rear face of said front panel, said support adaptable to mount at least one connector, wherein a front face of said support is accessible when said front panel is in said open position;
   a piston having a body and an extendable arm, said body of said piston coupled to said rear face of said base and said extendable arm directed towards said rear face of said front panel, said extendable arm of said piston adapted to bias said front panel to said open position upon release of a latch; and
   said latch having a body connected to said rear face of said base and a catch connected to said rear face of said front panel, wherein said body of said latch comprises two latch arms arranged to selectively engage said catch when said front panel is in said closed position, wherein said piston and said latch are located behind said support.

2. The mount of claim 1, further comprising at least one panel having one or more connectors, said at least one panel connected to said support.

3. The mount of claim 2, wherein at least one of said one or more connectors is a video input jack.

4. The mount of claim 2, wherein at least one of said one or more connectors is a video output jack.

5. The mount of claim 2, wherein at least one of said one or more connectors is an audio input jack.

6. The mount of claim 2, wherein at least one of said one or more connectors is an audio output jack.

7. The mount of claim 2, wherein said one or more connectors comprises jacks for audio visual equipment.

8. The mount of claim 2, wherein said one or more connectors comprises telephone jacks.

9. The mount of claim 2, wherein said one or more connectors comprises jacks for computer equipment.

10. A mount for one or more connectors comprising:
    a base having a planar configuration, said base having a front face and a rear face and an opening therethrough, said base adapted to be connected to a support structure;
    a front panel, said front panel having a front face and a rear face, said front panel hingedly connected to said base for selectively covering said opening, said front panel movable between a closed position in which said front panel extends along said front face of said base over said opening, and an open position in which at least a portion of said front panel is positioned outwardly from said base;
    a support extending from said rear face of said front panel, said support adaptable to mount at least one connector, said support accessible when said front panel is moved to said open position;
    a biasing means having a body for positioning said front panel, said body of said biasing means connected to said rear face of said base and configured to apply pressure to said rear face of said front panel, said biasing means capable of extending said front panel to said open position upon release of a latch; and
    said latch having a body connected to said base and a catch connected to said rear face of said front panel, wherein said body of said latch comprises two latch arms arranged to selectively engage said catch when said front panel is in said closed position, wherein said piston and said latch are located behind said support.

11. The mount of claim 10, further comprising at least one panel having one or more connectors, said at least one panel connected to said support.

12. A method of providing access to one or more connectors associated with a mount comprising:
    mounting a base having an opening therethrough to a support structure, said based having a planar configuration:
    hingedly connecting a movable front panel to said base to cover said opening, said front panel having a support extending said rear face of said front panel;
    connecting at least one adaptable panel having one or more connectors to said support;
    coupling a mechanism behind said support for moving said front panel from a closed position in which said front panel extends along a front surface of said base over said opening and held in place with a latching mechanism, to an open position in which at least a portion of said front panel is extended outwardly from said base and exposing said at least one adaptable panel, wherein said latching mechanism is located behind said support and comprises a body coupled to a rear face of said base and a catch connected to said rear face of said front panel, wherein said body of said latching mechanism comprises two latch arms arranged to selectively engage said catch when said front panel is in said closed position; and
    connecting said one or more connectors of said adaptable panel to at least one electrical device.

13. The method of claim 12, wherein at least one of said one or more connectors is a video input jack.

14. The method of claim 12, wherein at least one of said one or more connectors is a video output jack.

15. The method of claim 12, wherein at least one of said one or more connectors is an audio input jack.

16. The method of claim 12, wherein at least one of said one or more connectors is an audio output jack.

17. The method of claim 12, wherein said one or more connectors comprises jacks for audio visual equipment.

18. The method of claim 12, wherein said one or more connectors comprises telephone jacks.

19. The method of claim 12, wherein said one or more connectors comprises jacks for computer equipment.

20. A method of providing access to one or more connectors associated with a mount comprising:
    mounting a base having an opening therethrough to a support structure, wherein said base has a planar configuration;
    connecting a movable front panel to said base to cover said opening, said front panel having a support extending into said opening in said base;

connecting at least one panel having one or more connectors to said support; and coupling a biasing means behind said support for moving said front panel from a closed position in which said front panel extends along a front surface of said base over said opening to an open position in which at least a portion of said front panel is extended outwardly from said base and said at least one panel is exposed, wherein said front panel is held in said closed position with a latching mechanism having a body coupled to a rear face of said base and a catch connected to a rear face of said front panel, wherein said latching mechanism is located behind said support and said body of said latching mechanism comprises two latch arms arranged to selectively engage said catch when said front panel is in said closed position.

* * * * *